3,468,893
1-SUBSTITUTED-DIPHENYL-AZACYCLOALKENES
Renat Herbert Mizzoni, Long Valley, N.J., assignor to Ciba Corporation, New York, N.Y., a corporation of Delaware
No Drawing. Filed Mar. 14, 1966, Ser. No. 533,857
Int. Cl. C07d 29/12, 41/04; A61k 27/00
U.S. Cl. 260—293    11 Claims

ABSTRACT OF THE DISCLOSURE

N-hydroxyalkyl-aryl-alkyleneimines, their lower alkyl and aralkyl ethers and their hydrohalic and carboxylic acid esters, quaternaries and salts of these compounds, as well as methods for their preparation. The compounds are useful as hypotensive agents.

---

The present invention concerns and has for its object the provision of new N-hydroxyalkyl-arylalkyleneimines, their lower alkyl and aralkyl ethers and their hydrohalic and carboxylic acid esters, quaternaries and salts of these compounds, as well as methods for their preparation.

More particularly the present invention concerns compounds having the Formula I:

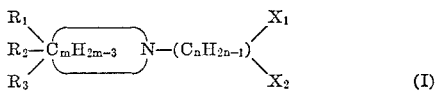
(I)

in which at least two of $R_1$ to $R_3$ stand for an aryl radical and the other for hydrogen, $m$ stands for an integer from 4 to 8, $n$ for an integer from 2 to 8, $X_1$ for hydroxy, lower alkoxy, monocyclic carbocyclic aryl-lower alkoxy, halogen or the acyloxy radical of a carboxylic acid having less than 20 carbon atoms, $X_2$ for hydrogen or one of the radicals shown for $X_1$, both $X_1$ and $X_2$ being separated from the imino nitrogen by at least two carbon atoms and being linked with two carbon atoms if they both represent hydroxy or acyloxy, lower alkylammonium salts and acid addition salts of these compounds.

The aryl radicals $R_1$ to $R_3$, two of which may substitute a single ring-carbon atom, stand preferably for monocyclic iso- or heterocyclic aryl, such as phenyl, pyridyl, thienyl or furyl. They may be unsubstituted or substituted by one or more than one of the same or of different substituents, such as lower alkyl, e.g. methyl, ethyl, n- or i-propyl, free of etherified hydroxy or mercapto, e.g. methoxy, ethoxy or methylenedioxy, methyl- or ethylmercapto, halogen, e.g. fluoro, chloro or bromo, trifluoromethyl, nitro, or amino, for example, di-lower alkylamino, e.g. dimethylamino or diethylamino. Preferred aryl radicals are phenyl, (lower alkyl)-phenyl, (lower alkoxy)-phenyl, (halogeno)-phenyl, (trifluoromethyl)-phenyl and (di-lower alkylamino)-phenyl.

The alkyleneimino ring, substituted at one to three ring-carbon atoms thereof by the above defined aryl radicals, contains a straight or branched alkylene group and represents above all piperidino, but also, for example, pyrrolidino, 1,5-, 1,6- or 2,5-hexyleneimino, 1,5- 1,6-, 1,7- or 2,6-heptylenemino or 1,8-, 3,6- or 3,7-octyleneimino.

The portion $-(C_nH_{2n-1})-$, linked with the imino-nitrogen atom and one or two free, etherified or esterified hydroxy groups, stands for straight or branched alkylene and preferably contains 2 to 4 carbon atoms. Examples for this hydroyalkyl group are the following: 1-hydroxy-ethyl-(2), -propyl-(2), -propyl-(3), -butyl-(2), -butyl-(3), -butyl-(4), -hexyl-(6), -heptyl-(5), -octyl-(4) or -2-methyl-propyl-(2); 2-hydroxy-propyl-(3), -butyl-(3), -butyl-(4), or -pentyl-(5); 3-hydroxy-butyl-(4) or -hexyl-(6); 1,2-dihydroxy-propyl-(3), -butyl-(3), -butyl-(4) or -pentyl-(5); 1,3-dihydroxy-propyl-(2), -butyl-(4), -pentyl-(5) or -2-methyl-butyl-(4); the corresponding mono- or bishaloalkyl groups in which the halogen atom is preferably chlorine or bromine, but it may also be fluorine or iodine, the corresponding mono- or bis-lower alkoxy- or aralkoxy-alkyl groups in which lower alkoxy is, for example, methoxy, ethoxy, n- or i-propoxy, n-, i-, sec. or tert, butoxy and aralkoxy, e.g. benzyloxy, 1- or 2-phenethoxy, 1-, 2- or 3-phenyl-propoxy or -butoxy, or the corresponding hydroxy alkyl groups fully or partially esterified with an aliphatic, alicyclic, araliphatic, aromatic or heterocyclic carboxylic acid having less than 20 carbon atoms, e.g. those mentioned below.

The new compounds possess valuable pharmacological properties. For example, they cause a marked decrease of the blood pressure which can be demonstrated, for example, at a dosage range between about 5–30 mg./kg./day, preferably 10–20 mg./kg./day, applied into a loop of the small intestine of dogs. The compounds of this invention are, therefore, useful as hypotensive agents in the management and treatment of essential hypertension and vasospastic conditions. They are also useful starting materials or intermediates in the manufacture of other valuable compounds, especially medicines.

Particularly useful are compounds of the Formula II:

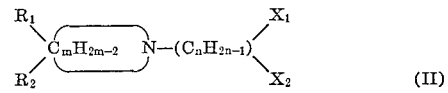
(II)

in which each of the radicals $R_1$ and $R_2$ stands for a monocyclic carbocyclic aryl radical, $m$ stands for an integer from 4 to 8, $n$ for an integer from 2 to 8, $X_1$ for hydroxy, lower alkoxy, monocyclic carbocyclic aryl-lower alkoxy, halogen or the acyloxy radical of a carboxylic acid having less than 20 carbon atoms, $X_2$ for hydrogen or one of the radicals shown for $X_1$ and both $X_1$ and $X_2$ being separated from the imino nitrogen by at least two carbon atoms and being linked with two carbon atoms if they both represent hydroxy or acyloxy, and acid addition salts thereof.

Compounds that are especially valuable are those of the Formula III:

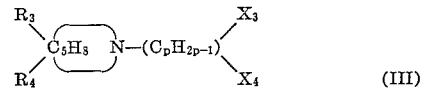
(III)

in which formula each of $R_3$ and $R_4$ stands for phenyl, (lower alkyl)-phenyl, (lower alkoxy)-phenyl, (halogeno)-phenyl, (trifluoromethyl)-phenyl, or (di-lower alkylamino)-phenyl, $p$ stands for an integer from 2 to 5, $X_3$ for hydroxy, lower alkoxy, chloro or bromo and $X_4$ for hydrogen or one of the radicals shown for $X_3$, both $X_3$ and $X_4$ being separated from the imino nitrogen by at least two carbon atoms and being linked with two carbon atoms if they both represent hydroxy, and acid addition salts thereof.

The compounds of the invention are prepared by methods in themselves known. For example, the process consists in:

(a) Replacing in an N—(R,R'—alkyl)-aryl-alkylene-imine, in which both of the substituents R and R' stand for a radical capable of being converted into free, etherified or esterified hydroxy or one of them stands for hydrogen, said substituents by hydroxy, lower alkoxy or aralkoxy or hydroxy esterified with a hydrohalic or carboxylic acid or (b) Adding water, hydrogen peroxide, a lower alkanol or aralkanol, a halo-lower alkyl lower alkyl or aralkyl ether, a hydrohalic, hypohalous, carboxylic or percarboxylic acid to an N-alkenyl-aryl-alkyleneimine and solvolysing any epoxide formed or (c) Reacting an N-unsubstituted aryl-alkyleneimine with an alkylene oxide, a hydroxy-alkylene oxide or a lower alkyl or aralkyl ether or a hydrohalic or carboxylic acid ester thereof, or with an alkanediol or triol of which one hydroxy group is reactively esterified, or a lower alkyl or aralkyl ether or a hydrohalic or carboxylic acid ester thereof or (d) Reducing in an N-hydroxyalkyl-aryl-alkyleneimine, containing in the ring and/or alkyl chain at least one carbamyl or ethenylene grouping, a lower alkyl or aralkyl ether or a hydrohalic or carboxylic acid ester thereof, said grouping to the methyleneimino or ethylene grouping respectively or (e) Reducing in an N—(R", R"'-alkyl)-arylalkyleneimine, in which both of the substituents R" and R"' stand for an oxo group separated from the imino nitrogen by at least two carbon atoms or for a free or esterified carboxy group separated from the imino nitrogen by at least one carbon atom, or one of R" and R"' stands for hydrogen, said substituents to hydroxy or hydroxymethyl respectively and, if desired, converting any product obtained into another compound of the invention.

The substiuents R and R' are capable of being converted into a free, etherified or esterified hydroxy stand, for example, for sulfonyloxy, free or acylated amino, diazo or carboxy salified with a metal, e.g. silver, mercury or potassium. Starting compounds in which at least one of R and R' represents aliphatic or aromatic sulfonyloxy, such as methane-, ethane-, benzene- or p-toluenesulfonyloxy, may be reacted, for example, with metal hydroxides, lower alkanolates or aralkanolates, carboxylates or halides, such as sodium or potassium hydroxide, methylate, ethylate or benzylate, a lithium, sodium or potassium salt of a carboxylic acid or lithium chloride or bromide. Diazonium salts may be reacted with aqueous acids, lower alkanols or aralkanols, carboxylic or hydrohalic acids, advantageously in the presence of catalysts, such as cuprous salts, e.g. cuprous chloride, in order to replace the diazo group by free or esterified hydroxy. Compounds in which at least one of R and R' represents amino, can be converted into the corresponding halides by reaction with a nitrosyl halide, e.g. nitrosyl chloride or bromide. The acylamino compounds, for example, the benzoylamino compounds, can be reacted with a phosphorus pentahalogenide, such as phosphorus pentachloride or pentabromide. The salts, especially the silver salts, of the N-carboxyalkyl-aryl-alkyleneimine starting compounds may be reacted with halogen, e.g. fluorine, chlorine, bromine or iodine, whereby carbon dioxide is split off and the new haloalkyl compounds are formed.

The addition of water, a lower alkanol or aralkanol, a halo-lower alkyl lower alkyl or aralkyl ether or a carboxylic acid, to the N-alkenyl-aryl-alkyleneimine starting compounds is advantageously carried out in the presence of a strong acid, such as sulfuric acid or a Lewis acid, e.g. boron trifluoride, zinc bromide, aluminum chloride, bismuth or antimony trichloride. The latter of which are advantageously used in the addition of a hydrohalic acid, for which purpose also peroxides, e.g. benzoyl peroxide, may be used. The addition of halogen to the alkenyl group normally takes place without the use of a catalyst as is the case with a hypohalous or percarboxylic acid, such as hypobromous, peracetic or perbenzoic acid. Hydrogen peroxide advantageously is used in the presence of acids, e.g. formic or pertungstic acid, or of an acidic oxide, e.g. selenium dioxide or osmium tetroxide. Any epoxide formed can be opened by solvolysis, for example, by the action of strong acids, such as aqueous sulfuric or perchloric acid, a carboxylic or hydrohalic acid, in the presence or absence of lower alkanols or aralkanols, or in the presence of the latter also by the action of bases, e.g. alkali metal alcoholates.

The alkylene oxides may advantageously be reacted with the N-unsubstituted aryl-alkyleneimine starting compounds in the presence of small amounts of water and/or acids, e.g. hydrochloric acid. The reactively esterified hydroxy-compounds mentioned under item (c) are, for example, hydrohalic or sulfonic acid esters, such as the hydrochloric, hydrobromic, benzene- or p-toluenesulfonic acid ester. In case said hydrohalic acid esters contain one or two halogen atoms more, these should have a smaller atomic weight than that of the halogen atom representing the reactively esterified hydroxy group. These compounds are advantageously reacted with the N-unsubstituted aryl-alkyleneimine starting compounds in the presence of a condensing agent, for example, an inorganic or organic base, such as an alkali metal carbonate, e.g. sodium or potassium carbonate, or a tertiary nitrogen base, e.g. trimethylamine or pyridine.

The carbamyl grouping present in the starting compounds mentioned under item (d), can be reduced to the methyleneimine grouping, for example, with a complex light metal hydride, e.g. lithium aluminum hydride. Those starting materials containing at least one double bond (or ethenylene grouping respectively), in the azacyclic ring and/or in the alkyl chain, may be reduced with catalytically activated or nascent hydrogen, e.g. hydrogen in the presence of palladium, Raney nickel or platinum oxide. In said starting material, containing only one double bond in the ring, this double bond preferably extends from the ring carbon atom that carries an aryl radical. Said starting material may contain more than one double bond in the azacyclic ring, depending on the number of ring-carbon atoms present. A 6- membered ring, for example, may contain up to 3 double bonds, in which case the starting material in an N-substituted pyridinium salt.

Finally the starting compounds containing at least one oxo or carboxy group in the alkyl chain can be reduced to the corresponding hydroxy-compounds, for example, with catalytically activated or nascent hydrogen, e.g. hydrogen in the presence of platinum oxide or Raney nickel or hydrogen generated by the reaction of a metal, e.g. sodium, magnesium or aluminum, or an amalgam thereof, with aqueous solutions of alcohols, e.g. lower alkanols, with alcohols in the presence of aluminum alkoxides, e.g. aluminum isopropoxide, or advantageously with complex light metal hydrides, e.g. lithium aluminum hydride or sodium borohydride. In the latter case the analogous reactions under (d) and (e) may be combined by selecting the appropriate starting material.

The compounds of the invention so obtained, may be converted into each other by methods in themselves known. Thus, for example, an N-hydroxyalkyl-aryl-alkyleneimine obtained may be reacted with a halogenating agent, for example, a hydrohalic acid, such as hydrochloric, hydrobromic or hydroiodic acid, a sulfur halogenide, such as sulfur tetrafluoride, disulfur dichloride or dibromide, a thionylhalide, such as thionylchloride or -bromide, a phosphorus halide, such as phosphorus trichloride, tribromide or triiodide or a phosphoric acid halide, such as phosphorous oxychloride or -bromide, triphenoxy-phosphorus dichloride or bromide, triphenoxy-phosphorous dichloride or triphenoxy-benzyl-phosphorus brimide; or with a reactive functional derivative of a carboxylic acid, such as a halide or anhydride thereof. Esters obtained may be hydrolyzed or transesterified, e.g. by reaction with aqueous bases, alcohols or carboxylic acids, in the presence of acids or bases. The quaternaries are obtained from the free bases by reacting them preferably with reactively esterified lower alkanols, e.g. lower alkyl halides.

The compounds of the invention are obtained in the free form or in the form of their salts, depending on the conditions under which the process is carried out. Salts that are obtained can be converted into the free bases in known manner, for example, with alkalis or ion exchangers or into other salts which are less soluble in the particular solvent used, for example, by reacting it with an acid or a soluble salt thereof, or by treatment with a suitable ion exchange preparation. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, hydroxybenzoic, salicylic, aminosalicylic, embonic, nicotinic, methane sulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example the picrates, can also be used for purification of the bases obtained; the bases are converted into such salts, which are separated and the bases are liberated again. In view of the close relationship between the free compounds and the compounds in the form of their salts, whenever a free base is referred to in this context, a corresponding salt is also intended, provided such is possible or appropriate under the circumstances.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process, in which an intermediate product obtainable at any stage of the process is used as starting material and any remaining steps are carried out, of the process is discontinued at any stage thereof, or in which the starting materials are formed under the reaction conditions, or in which the reaction components may be used in the form of their salts. The present reactions are preferably performed with those starting materials that lead to the compounds indicated above as being specially valuable.

The starting materials are known or, if they are new, may be prepared by methods in themselves known, for example, as described in U.S. Patent No. 2,524,643, J. Chem. Soc. 1956, 960, Tetrahedron 5, 48 (1959) and J. Amer. Chem. Soc. 75, 4295 (1953). Several starting materials, e.g. those mentioned under (c) and the aminoalkyl compounds covered by the process mentioned under (a) may be prepared analogous to the method described in copending application Ser. No. 392,931, filed Aug. 28, 1964. The N-aminoalkyl-aryl-alkyleneimines can be acylated or diazotated respectively, for example, with an acid halide, such as benzoyl chloride or with nitrous acid. The N-carboxyalkyl-aryl-alkyleneimines can be prepared from the corresponding N-unsubstituted aryl-alkyleneimines by reaction with halogenated alkanoic acid esters, advantageously in the presence of a base, e.g. those mentioned above. Thereupon the ester obtained may be hydrolyzed and converted into a metal salt by the usual methods. The N-alkenyl-aryl-alkyleneimine starting compounds may be prepared from the N-unsubstituted aryl-alkyleneimines by reaction with a reactive esterified alkenol, for example, an aryl sulfonyloxy- or halogenoalkene in the presence of a suitable base. Finally the N-hydroxyalkyl aryl-alkyleneimines containing at least one carbamyl or ethenylene grouping and the N-oxoalkyl-aryl-alkyleneimines may be prepared analogous to the method described under (c) by selecting the appropriate reagents, for example, by reaction of an N-unsubstituted aryl-alkenyleneimine or oxoalkyleneimine with an alkylene oxide, such as ethylene oxide or 1,2-propylene oxide, a free or reactively esterified alkylene halohydrin, e.g. ethylene chlorohydrin, 1-chloro-2-bromoethane, 1-bromo-3-p-tosyloxy-propane or a 1-bromo-2-lower alkanoyloxy-ethane, or by reaction of a corresponding N-unsubstituted aryl-alkyleneimine or alkenyleneimine with an esterified hydroxy alkanoyl halide, e.g. chloracetyl chloride or β-benzoyloxy-propionyl-chloride, or a reactively esterified hydroxy-alkanol or -alkanone or an acetal or ketal thereof.

Starting materials or final products that are mixtures of isomers may be separated into simple isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into the pure racemates, for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention can be used, for example, for the manufacture of pharmaceutical compositions containing them in conjunction or admixture with inorganic or organic, solid or liquid pharmaceutical excipients, suitable for enteral, parenteral or topical administration. Suitable excipients are substances that do not react with said compounds of the invention, for example water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragées, or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples illustrate the invention; temperatures are given in centigrade and all parts given are parts by weight.

Example 1

To the stirred mixture of 31.9 g. 2-bromo-ethanol, 46.0 g. anhydrous sodium carbonate and 200 ml. benzene, the solution of 59.9 g. 3,5-diphenyl-piperidine in 250 ml. benzene is added dropwise and hereupon the mixture is refluxed for 24 hours. It is filtered, the residue washed with hot benzene, the filtrate evaporated in vacuo, the residue distilled and the fraction boiling at 152–162°/0.55 mm. Hg collected; it represents the 1-(2-hydroxyethyl)-3,5-diphenyl-piperidine of the formula

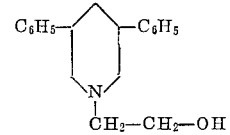

The starting material is prepared as follows: The mixture of 900 g. phenyl-acetaldehyde, 150 g. isobutyraldehyde and 450 ml. saturated ethanolic ammonia is placed in an autoclave and heated to about 225° for 6 hours. It is then cooled, filtered and the residue recrystallized first from anhydrous ethanol and then from isopropanol to yield the 3,5-diphenyl-pyridine melting at 130–136°.

29.7 g. thereof are dissolved in 250 ml. glacial acetic acid and hydrogenated over 16.0 g. 10% palladium charcoal at 80° and 3 atmospheres pressure. After consumption of the theoretical amount of hydrogen, the mixture is diluted with water and filtered. The filtrate is evaporated in vacuo, the residue dissolved in a little water, the solution made basic with 50% aqueous sodium hydroxide and extracted with methylene chloride. The extract is dried and evaporated, the residue distilled and the fraction boiling at 134–140°/0.05 mm. Hg. collected; it represents the 3,5- diphenyl-piperidine of which the hydrochloride melts at 249°.

Example 2

The solution of 49.7 g. 1-(2-hydroxy-ethyl)-3,5-diphenylpiperidine in 160 ml. toluene is added dropwise to the solution of 22.6 g. thionyl chloride in 320 ml. toluene and the whole is refluxed for three hours. The mixture is evaporated in vacuo, the gummy residue triturated with diethyl ether, dissolved in acetone and precipitated with diethyl ether. The residue is redissolved in acetone, the solution decolorized with charcoal, filtered and the filtrate diluted with diethyl ether. The precipitate formed is filtered off and recrystallized first from acetone-diethyl ether and then from ethanol-diethyl ether to yield the 1-(2-chloroethyl) - 3,5 - diphenyl - piperidine hydrochloride of the formula

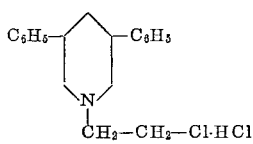

melting at 190–192°.

Example 3

The solution of 15.0 g. 3,3-diphenyl-piperidine in 50 ml. benzene is added dropwise to the stirred mixture of 7.9 g. 2-bromo-ethanol, 75 ml. benzene and 11.5 g. anhydrous sodium carbonate. The mixture is then refluxed for 20 hours, filtered hot and the residue washed with hot benzene. The filtrate is evaporated in vacuo, the residue distilled and the fraction boiling at 190–192°/1.0 mm. Hg collected; it represents the 1-(2-hydroxy-ethyl) 3,3-diphenyl-piperidine of the formula

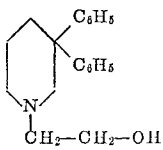

melting at 77–78°.

The starting material is prepared as follows: The mixture of 40 g. α,α-diphenyl-glutaric acid mononitrile ethyl ester, 210 ml. methanol, 40 g. anhydrous ammonia and 5.5 g. Raney nickel is hydrogenated at 100–125° and 1,000 p.s.i. The hot mixture is diluted with methanol, filtered, the filtrate refrigerated and the precipitate formed filtered off; it represents the 3,3-diphenyl-2-piperidone melting at 186–187°.

25 g. thereof are dissolved in 2 liters tetrahydrofuran and the solution added to the stirred suspension of 9.5 g. lithium aluminum hydride in 125 ml. tetrahydrofuran. The mixture is refluxed for 40 hours while stirring and after cooling 30 ml. ethyl acetate, 10 ml. water, 20 ml. 15% aqueous sodium hydroxide and 30 ml. water are added in this order. It is then filtered, the residue washed with tetrahydrofuran and the filtrate evaporated in vacuo. The residue is distilled and the fraction boiling at 125–128°/0.2 mm. Hg collected; it represents the 3,3-diphenyl-piperidine, of which the hydrochloride melts at 229–230°.

Example 4

The solution of 13.0 g. 1-(2-hydroxy-ethyl)-3,3-diphenyl-piperidine in 35 ml. benzene is added over a period of 3 hours to the stirred solution of 6.1 g. thionyl chloride in 75 ml. benzene at room temperature. The mixture is then refluxed for 6 hours and stirred overnight at room temperature. It is filtered and the residue recrystallized from isopropanol-diethyl ether to yield the 1-(2-chloroethyl)-3,3-diphenyl-piperidine hydrochloride of the formula

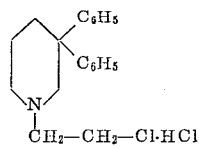

melting at 183–185°.

Example 5

The solution of 18.0 g. 2,3-diphenyl-piperidine in 55 ml. benzene is added dropwise to the stirred suspension of 9.4 g. 2-bromo-ethanol, 75 ml. benzene and 13.5 g. anhydrous sodium carbonate and the whole is refluxed for 24 hours. It is then filtered hot, the residue washed with hot benzene, the filtrate evaporated in vacuo, the residue distilled and the fraction boiling at 132–140°/0.05 m. Hg collected. It is dissolved in ethyl acetate, the solution acidified with hydrogen chloride in ethyl acetate, the precipitate filtered off, dissolved in water, the solution made basic with aqueous sodium hydroxide and extracted with methylene chloride. The extract is dried, evaporated, the residue distilled and the fraction boiling at 137–140°/0.15 mm. Hg collected; it represents the 1-(2-hydroxy-ethyl) 2,3-diphenyl-piperidine of the formula

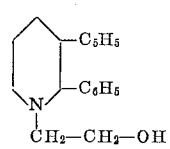

The starting material is prepared as follows: 16.0 g. acrylonitrile are added dropwise to the mixture of 58.5 g. desoxybenzoin, 5.3 g. Triton B and 130 g. tert. butanol at 45–50° while stirring and cooling. The mixture is then stirred for 5 hours at 50–53° and allowed to stand overnight at room temperature. It is then poured into 500 ml. 3 N hydrochloric acid and the solution chilled in an ice bath. The precipitate formed is filtered off and recrystallized from ethanol to yield the γ-phenyl-γ-benzoyl-butyronitrile melting at 82–84°.

61.5 g. thereof are dissolved in 130 ml. tert. butanol, 18 ml. 30% methanolic potassium hydroxide are added and the whole is refluxed and stirred for 36 hours. The cold solution is neutralized 3 N-hydrochloric acid, diluted with water, filtered and the residue recrystallized from methanol-ethanol to yield the Δ²-2,3-diphenyl-6-piperidone melting at 225–227°.

39.5 g. thereof are dissolved in 200 ml. glacial acetic acid and hydrogenated at 3 atmospheres and 50° over 6.0 g. 10% palladium-charcoal. The cold mixture is filtered, the filtrate evaporated in vacuo and the residue recrystallized from ethanol to yield the 2,3-diphenyl-6-piperidone melting at 183–183.5°.

The solution of 39.0 g. thereof in 750 ml. tetrahydrofuran is added dropwise to the stirred suspension of 12.0 g. lithium aluminum hydride in 150 ml. tetrahydrofuran and hereupon the mixture is stirred and refluxed for 40 hours. After cooling 36 ml. ethyl acetate, 12 ml. water, 24 ml. 15% aqueous sodium hydroxide and 36 ml. water are added in this order, the mixture is filtered and the residue washed with tetrahydrofuran. The filtrate is evaporated in vacuo and the residue recrystallized from ethanol to yield the 2,3-diphenyl-piperidine melting at 82–84°; the hydrochloride of which melts at 88–90°.

Example 6

The solution of 13.0 g. 1-(2-hydroxy-ethyl)-2,3-diphenyl-piperidine in 35 ml. benzene is added during 20 minutes to the solution of 6.1 g. thionyl chloride in 75 ml. benzene while stirring. The mixture is refluxed for 5 hours and stirred overnight at room temperature. It is then evaporated in vacuo, the residue triturated with 50 ml. benzene, filtered off and recrystallized from isopropanol to yield the 1-(2-chloroethyl)-2,3-diphenyl-piperidine hydrochloride of the formula

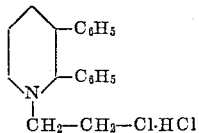

melting at 223–225°.

Example 7

The solution of 23.7 g. 3,5-diphenyl-piperidine in 50 ml. of benzene is added to a mixture of 15.7 g. 1-bromo-2-chloro-ethane, 100 ml. benzene, 18 g. sodium carbonate and a drop of water. The reaction mixture is refluxed with stirring for 20 hours, hereupon filtered, the filtrate gassed with hydrogen chloride and concentrated in vacuo. The residue is recrystallized from ethanol-diethyl ether to yield the 1-(2-chloro-ethyl)-3,5-diphenyl-piperidine hydrochloride, which is identical with the product obtained according to Example 2.

Example 8

The solution containing 27.7 g. 1-allyl-3,5-diphenyl-piperidine and a trace of benzoyl peroxide in 120 ml. benzene is treated with hydrogen chloride for 20 hours. After concentration of the reaction mixture under reduced pressure, there is obtained the hygroscopic 1-(3-chloro-propyl) - 3,5-diphenyl-piperidine-hydrochloride of the formula

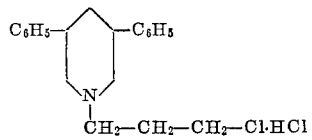

which is recrystallized from isopropanol-diethyl ether.

The solution of the starting material is obtained by refluxing the mixture of 23.7 g. 3,5-diphenyl-piperidine, 150 ml. benzene, 12.1 g. allyl bromide, 18 g. sodium carbonate and a trace of water for 20 hours with stirring and filtering the reaction mixture.

Example 9

A solution of 28.0 g. 1-(2-amino-ethyl)-3,3-diphenyl-piperidine in 22 g. concentrated hydrochloric acid is diluted with 75 ml. water, cooled to 0° and mixed with a solution of 7.0 sodium nitrite in 20 ml. water. Thereupon the mixture, containing the corresponding diazonium salt, is added to 50 ml. of a boiling 10% solution of cuprous chloride in concentrated hydrochloric acid. After cooling the reaction mixture is extracted with benzene and the extracts concentrated under reduced pressure. The 1-(2-chloro-ethyl)-3,3-diphenyl-piperidine hydrochloride so obtained is recrystallized from isopropanol-diethyl ether; it is identical with the product obtained according to Example 4.

Example 10

The mixture of 23.7 g. 3,5-diphenyl-piperidine, 11.1 g. 3-chloro-1,2-propanediol, 20.0 g. sodium carbonate and a trace of water is refluxed for 20 hours while stirring. The hot solution is filtered, the residue washed with hot benzene and the filtrate evaporated under reduced pressure. The residue is distilled in vacuo and the fraction boiling at 155–165°/0.05 mm. collected; it represents the 1-(2,3-dihydroxy-propyl)-3,5-diphenyl-piperidine of the formula

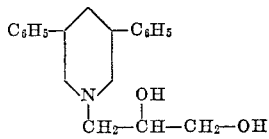

Example 11

To the stirred mixture of 9.5 g. 3,5-diphenyl-piperidine 50 ml. benzene, 10.0 g. sodium carbonate and 1 drop water, the solution of 6.1 g. 2-bromoethyl ethyl ether in 50 ml. benzene is added dropwise. The mixture is stirred and refluxed for 24 hours, hot filtered, the filtrate evaporated, the residue distilled and the fraction boiling at 147–157°/0.05 mm. collected; it represents the 1-(2-ethoxy-ethyl)-3,5-diphenyl-piperidine of the formula

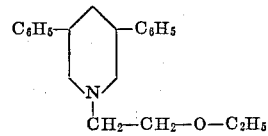

Example 12

The mixture of 31 g. 1-(2-hydroxy-ethyl)-3,5-diphenyl-pyridinium chloride, 60 ml. methanol and 0.45 g. platinum oxide is hydrogenated at 50 p.s.i. initial pressure and about 50°. On completion of reduction it is filtered, the filtrate neutralized with methanolic sodium hydroxide and evaporated in vacuo. The residue is taken up in benzene, the solution dried, evaporated and the residue distilled. The fraction boiling at 152–162°/0.05 mm. represents the 1 - (2-hydroxy-ethyl)-3,5-diphenylpiperidine, which is identical with the product obtained according to Example 1.

The starting material is prepared as follows: To the mixture of 23 g. 3,5-diphenyl-pyridine and 40 ml. toluene 12 g. ethylene chlorohydrin are added and the mixture is refluxed for 24 hours while stirring. Hereupon it is cooled in an ice bath, filtered, the residue washed with cold toluene and dried in vacuo, to yield the 1-(2-hydroxy-ethyl)-3,5-diphenyl-pyridinium chloride.

Example 13

In the manner described in the previous examples, the following compounds are prepared from the equivalent amounts of the corresponding starting materials: 1-(2-hydroxy-or chloro-ethyl)-4,4-diphenyl-piperidine, 1-(2-hydroxy-or chloro-ethyl)-3,4-diphenyl-piperidine, 1,(2-hydroxy or chloro-ethyl)-2,5-diphenyl-piperidine, 1-(3-hydroxy-or bromo-propyl)-2,4,6-triphenyl-piperidine, 1-(4-hydroxy-or acetoxybutyl)-3,5-di-p-tolyl-piperidine, 1-(2,3 - dihydroxy-butyl) - 3,3-di-(4-methoxy-phenyl)-pyrrolidine, N-(2-hydroxy or chloro-propyl)-4,5-diphenyl-1,6-hexyleneimine, N-(5-hydroxy-or chloro-pentyl)-5,5-di-(4-trifluoromethyl-phenyl)-1,7-heptyleneimine and N-(2-hydroxy or ethoxy-ethyl)3,5,-di-(4-dimethylamino-phenyl)-2,6-heptyleneimine, and their salts, particularly their hydrochlorides.

What is claimed is:
1. A compound having the formula

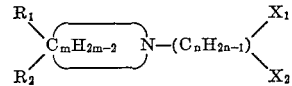

in which each of the radicals $R_1$ and $R_2$ stands for a member selected from the group consisting of phenyl, (lower alkyl)-phenyl, (lower alkoxy)-phenyl, (halogeno)-phenyl, (trifluoromethyl)-phenyl and (di-lower alkylamino)-phenyl, $m$ stands for an integer from 4 to 8, $n$ for in integer from 2 to 8, $X_1$ for a member selected from the group consisting of hydroxy, halogen and lower alkanoyloxy, $X_2$ for a member selected from the group consisting of hydrogen and one of the radicals shown for $X_1$ both $X_1$ and $X_2$ being separated from the imino nitrogen by at least two carbon atoms and being linked with two carbon atoms when they both represent hydroxy or lower alkanoyloxy, and acid addition salts thereof.

2. A compound as claimed in claim 1 and having the formula

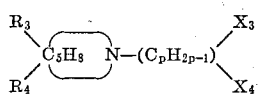

in which each of $R_3$ and $R_4$ stands for a member selected from the group consisting of phenyl, (lower alkyl)-phenyl, (lower alkoxy)-phenyl, (halogeno)-phenyl, (trifluoromethyl)-phenyl and (di-lower alkylamino)-phenyl, $p$ stands for an integer from 2 to 5, $X_3$ for a member selected from the group consisting of hydroxy, chloro and bromo, $X_4$ for a member selected from the group consisting of hydrogen and one of the radicals mentioned for $X_3$, both $X_3$ and $X_4$ being separated from the imino nitrogen by at least two carbon atoms and being linked with two carbon atoms when they both represent hydroxy, and acid addition salts thereof.

3. A compound as claimed in claim 2, and being the 1-(2-hydroxy-ethyl)-3,5-diphenyl-piperidine or an acid addition salt thereof.

4. A compound as claimed in claim 2, and being the 1-(2-chloro-ethyl)-3,5-diphenyl-piperidine or an acid addition salt thereof.

5. A compound as claimed in claim 2, and being the 1-(2-hydroxy-ethyl)-3,3-diphenyl-piperidine or an acid addition salt thereof.

6. A compound as claimed in claim 2, and being the 1-(2-chloro-ethyl)-3,3-diphenyl-piperidine or an acid addition salt thereof.

7. A compound as claimed in claim 2, and being the 1-(2-hydroxy-ethyl)-2,3-diphenyl-piperidine or an acid addition salt thereof.

8. A compound as claimed in claim 2, and being the 1-(2-chloro-ethyl)-2,3-diphenyl-piperidine or an acid addition salt thereof.

9. A compound as claimed in claim 2, and being the 1-(3-chloro-propyl)-3,5-diphenyl-piperidine or an acid addition salt thereof.

10. A compound as claimed in claim 2, and being the 1-(2,3-dihydroxy-propyl)-3,5-diphenyl-piperdine or an acid addition salt thereof.

11. The 1-(2-ethoxy-ethyl)-3,5-diphenyl-piperdine or an acid addition salt thereof.

References Cited

UNITED STATES PATENTS 2,891,066  6/1959  Parcell _____ 260—294.3
2,975,193  3/1961  Dice et al. _____ 260—326.5

FOREIGN PATENTS 359,703  3/1962  Switzerland.

HENRY R. JILES, Primary Examiner
G. T. TODD, Assistant Examiner

U.S. Cl. X.R.

260—239, 293.4, 294.3, 294.7, 326.3, 326.5, 326.85, 326.8, 999